(NO DELAY)

(R_X ADDED)

INVENTOR.
HARRY A. WILCOX

BY Harold A. Dixon

ATTORNEY

INVENTOR.
HARRY A. WILCOX
BY Harold A. Dixon
ATTORNEY

Sept. 22, 1964 H. A. WILCOX 3,150,349
TRAFFIC CONTROL SYSTEM AND CONTROLLER
Filed Jan. 13, 1961 7 Sheets-Sheet 7

INVENTOR
HARRY A. WILCOX
BY
ATTORNEY

United States Patent Office 3,150,349
Patented Sept. 22, 1964

3,150,349
TRAFFIC CONTROL SYSTEM AND CONTROLLER
Harry A. Wilcox, Westport, Conn., assignor, by mesne assignments, to Laboratory for Electronics, Inc., Boston, Mass., a corporation of Delaware
Filed Jan. 13, 1961, Ser. No. 82,584
24 Claims. (Cl. 340—37)

This invention relates to a functionally and structurally improved traffic controller and system and to an improved method and apparatus for timing right-of-way periods within the controller.

This invention is capable of use in numerous different associations, but is primarily intended for use at the intersection of two or more roadways.

More particularly this invention relates to a semi-actuated traffic controller for the intersection of a main artery and a side-street in which green right-of-way signals normally allow traffic to flow on the main artery and in which the right-of-way is transferred to the side-street in response to actuation of a side-street vehicle detector switch by the presence of a side-street vehicle. The right-of-way in such a controller is then retained on the side-street for either an extendible minimum or a maximum time period; the green right-of-way signal is subsequently re-transferred back to the main artery and retained there until another side street vehicle again operates the vehicle detector to start a new traffic signal cycle.

The side street extendible minimum time period and the maximum time period means each include capacitor charge-varying timing circuits; both of these circuits vary in charge simultaneously during the side-street right-of-way period at different rates and either circuit may initiate the termination of the side-street right-of-way period. During the side-street right-of-way period, the side-street vehicle detector switch (when operated by a vehicle) resets the charge on the minimum timing circuit capacitor so that the minimum timing period (as represented by the capacitor charge) is extendible in dependence upon the close spacing of side-street vehicles. To prevent undue minimum right-of-way extension, the maximum timer acts as a limit to re-transfer right-of-way to the main artery regardless of the continued presence of side-street vehicles and their consequent extension of the minimum timer.

Such prior systems simultaneously time the extendible minimum and maximum right-of-way period of the side-street through condensers, resistors and relays individual to each of the timing periods.

Another such system uses a series of minimum timing steps during which side-street right-of-way is allowed. Within each of these minimum steps, vehicle actuation on the side street will extend the time in that step so that a maximum time period will occur only if each of the steps has been extended. Such a system has the disadvantage that no switching of traffic signals can occur until each of the steps has been completed whether extended or not. Such operation limits the minimum time within which the side-street right-of-way may be terminated.

One aspect of the invention provides two timing circuits each having an element which varies in voltage with time and in which the timing circuits are alternately interrogated or measured sequentially so that a voltage operated device will respond to either one of the interrogated circuits which has reached a predetermined charge to thereby transfer the right-of-way after a time interval determined by the one timing circuit. Thus rapid response to the completion of one of two time periods depends largely upon the rapidity of interrogation.

The present invention provides a method and apparatus for the rapid synchronous alternate connection for timing and alternate sampling (interrogation or measurement) of an extendible minimum and a maximum timing circuit concurrently during the side-street right-of-way period so that the re-transfer of right-of-way is rapidly initiated upon completion of either the extendible minimum or maximum time in dependence largely upon the rapidity of the synchronous connecting and sampling.

The word concurrent is used throughout the specification in the sense of acts happening contemporaneously during the same time period but not necessarily at the same time within that time period.

These aspects of the invention are provided in a printed circuit including, synchronous switching means for alternately varying the charge on each of two condensers concurrently during one phase of a traffic signal cycle to control the transfer of right-of-way signals after one of the condensers has reached a predetermined charge. Several embodiments of these aspects of the invention are disclosed in which the two condensers may be of the same or different values and in which the condensers are connected to be charged or discharged for a timed minimum or maximum period.

Another aspect of the invention is the provision of a relatively inexpensive, compact, long life, easily repairable motor driven cyclic device using printed circuit contacts for energizing the motor in a step-by-step fashion through the individual phases of a traffic signal cycle or through a series of steps comprising a maximum time delay.

Another aspect of the invention is the provision of extendible minimum and maximum timing circuits which are contemporaneously timed, during a single traffic phase, through a common impedance by alternate switching of the timing circuits and in which the timing circuits are alternately sampled in synchronism with their switching so that a common element may be operated by and when either of the timing circuits so sampled has reached a predetermined time value.

In addition to the disadvantages of a specific controller mentioned above, prior art traffic controllers have long been complicated by bulky, expensive, mechanical cyclic elements for determining the traffic signal cycle which are difficult to repair and adjust. In addition, separate timing resistors have often been used for timing each phase of the traffic signal cycle and for the extension minimum and maximum circuits so that no common base is provided between the timing means.

Accordingly, it is an object of this invention to provide a long life, maintenance free, economical, printed circuit traffic controller.

An object is to provide rapid switching or transfer of traffic signals after the first termination of either of two time periods by the rapid sampling of such timing means for operation of a common member which controls the switching.

Another object is to provide a new apparatus and method for timing two periods, concurrently within a single traffic signal phase, by the rapid alternate connection of the two timing circuits to a common timing impedance.

An object is to connect a single impedance to at least two condensers alternately during one time period of a traffic signal cycle to provide at least two time periods any one of which may terminate the one period of the traffic cycle. A further object is to connect the condensers to the resistor so that the periods are each individually adjustable.

Another object of the invention is to provide a common responsive means which can respond to either one of two timing circuits within a single phase of the traffic cycle.

A further object is to provide a new traffic apparatus and method for timing two periods, contemporaneously within a single traffic signal phase, by the rapid alternate connection of two timing circuits and rapid alternate sampling of the two timing circuits so that said traffic phase may be terminated by whichever one of said timing circuits completes its time period.

An object is to provide a cyclic timer having a sequential series of printed circuit contacts which are scanned cyclically in timed steps to control traffic signals.

An object is to provide a maximum cyclic timer in which a long adjustable maximum period is timed in a series of adjustable short timed steps which are accumulated to form a maximum time by utilizing a printed circuit contact for each step in sequence.

Another object is to provide a single bank of resistors and a plurality of capacitors for the timing of a plurality of individually adjustable time functions by the successive cyclic connection of the respective capacitors to adjusted positions on the bank.

A still further object is to provide for adjustably timing two phases of a traffic signal cycle by similar adjusting means with only two capacitors and a common impedance, in one of which phases the two capacitors are alternately connected to the common impedance.

Still further objects include the provision of a printed circuit cyclic traffic controller having a printed circuit contact positioned to accurately provide preemption control at the termination of the one of the traffic phases, preferably at the end of a clearance interval.

Another object is to provide a printed circuit cyclic traffic controller having a plurality of cyclic means which affect the operation of each other all printed on the same panel so that the operation of the controller may be visually observed.

Another object is to provide a traffic controller having a maximum timer which begins timing at the start of an initial green period and continues timing throughout the succeeding vehicle green period so that the maximum timer may terminate the entire green period in addition to the usual methods of terminating the initial and vehicle periods.

Another object is to provide a printed circuit traffic controller having a printed contact for forcing the controller out of one or more steps in its cycle.

With these and further objects in mind, reference is had to the following sheets of drawing illustrating several practical embodiments of the invention in which:

FIG. 1 illustrates diagrammatically a street intersection and the traffic system associated therewith.

FIG. 2 including 2A, 2B, 2C and 2D illustrate schematically several embodiments of a timing circuit, in a traffic signal control system, for alternately timing two different intervals concurrently in one period of a traffic cycle by the alternate charging of two condenser timing means for equal time periods; the charge on both condensers is sampled and either condenser means may operate a single relay to energize traffic signal switching means to initiate termination of the period upon the completion of a predetermined timing interval by either one of the condensers.

Figure 2A:
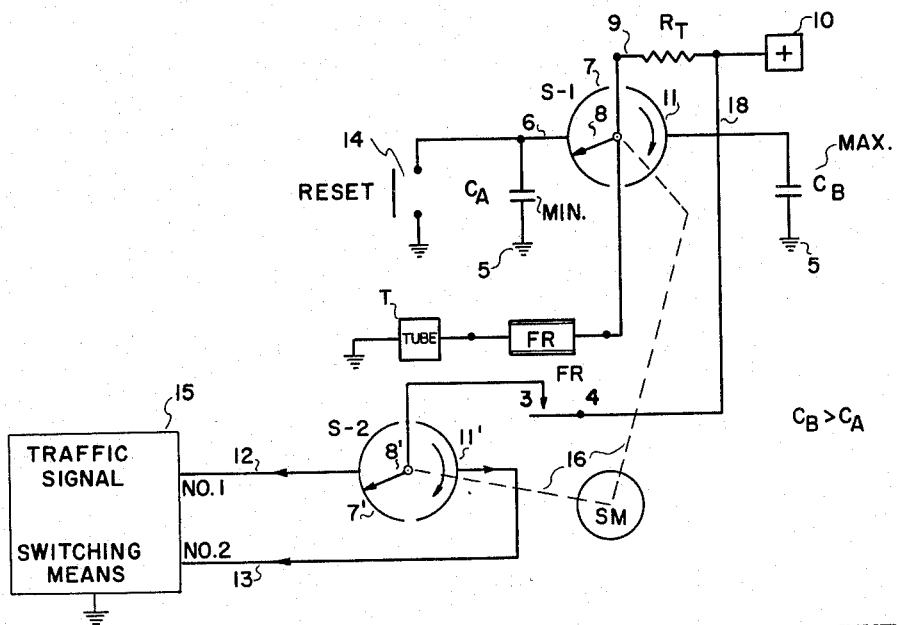
FIG. 2A illustrates such a timing circuit in which the condensers are of unequal value.
Figure 2B:
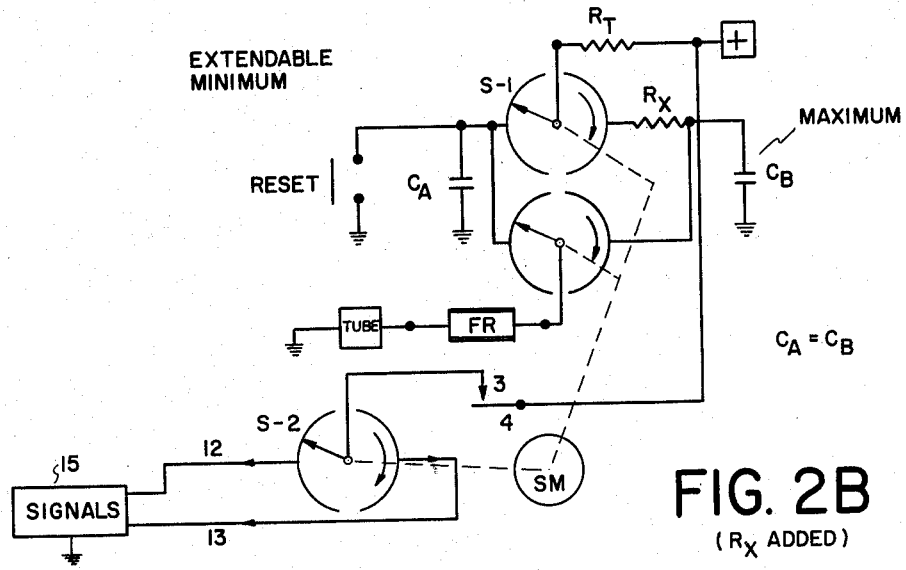
FIG. 2B illustrates schematically a timing circuit, in a traffic signal system, as in FIG. 2A with the exception that the capacitors have the same value and $R_x$ has been added.
Figure 2C:
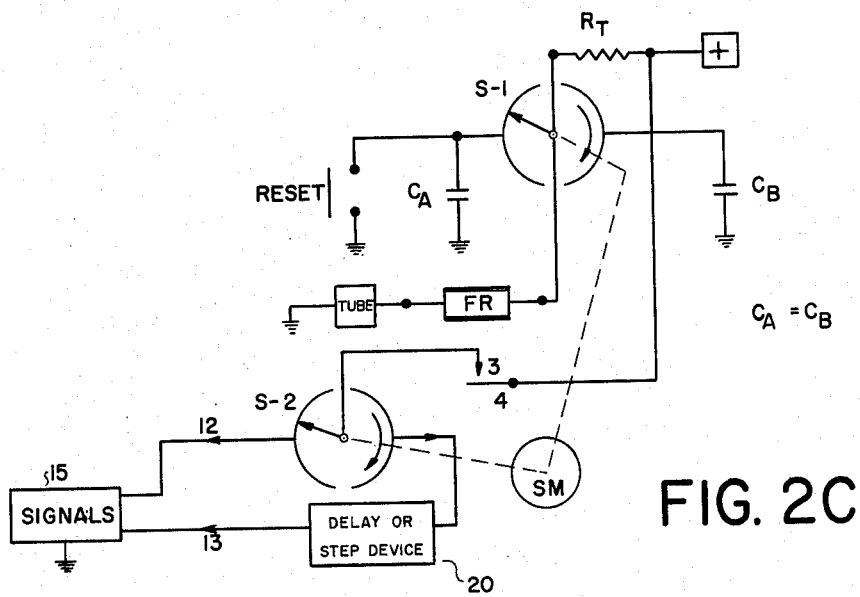
FIG. 2C illustrates schematically a timing circuit, in a traffic signal control system, as in FIG. 2A with the exception that the two condensers have the same value and in which a delay or stepping device is associated with one of the capacitors to derive one of the time periods.
Figure 2D:
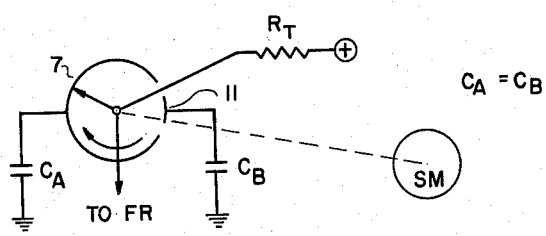

FIG. 2D schematically illustrates a timing circuit, in a traffic controller, as in FIGS. 2A, 2B or 2C in which the condensers have the same value but the charging times are considerably different.

Figure 3:
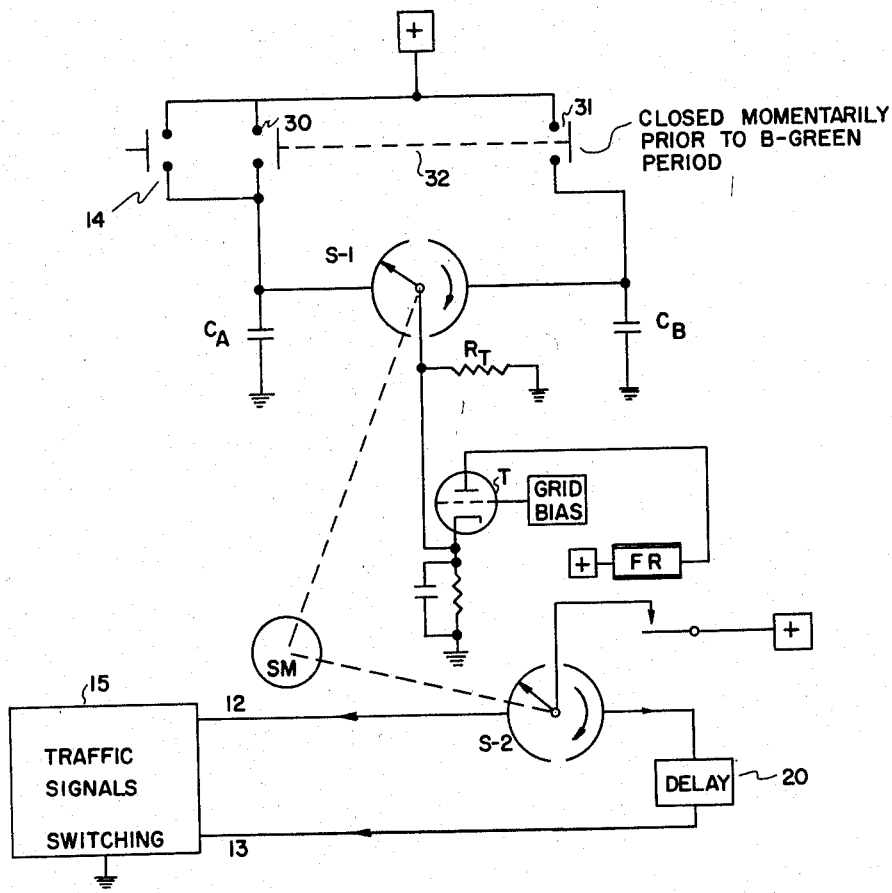

FIG. 3 illustrates schematically a timing circuit, in a traffic signal system, in which the discharge of the capacitors may be used to perform the timing functions of either FIGS. 2A, 2B, 2C or 2D.

Figure 4:
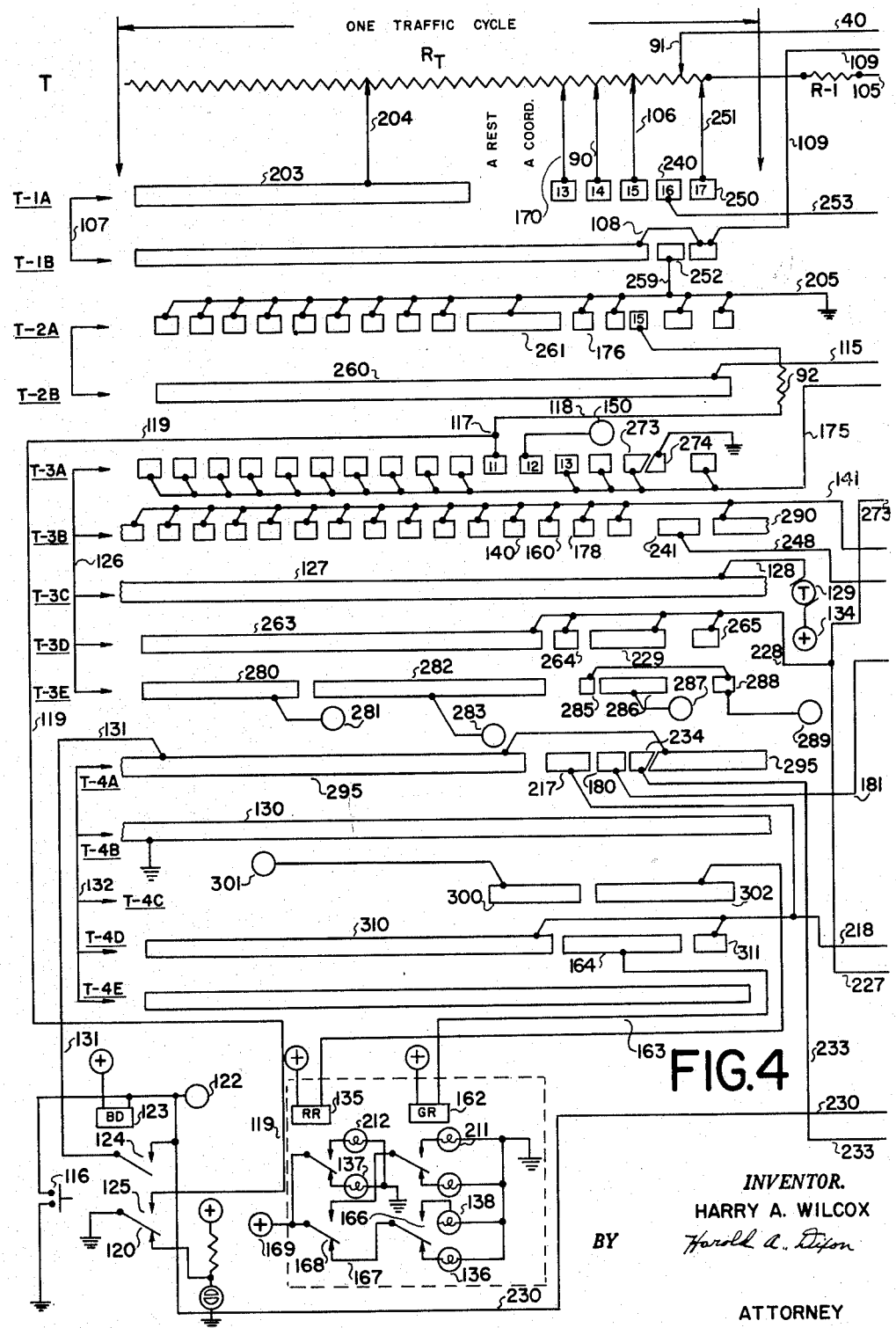
Figure 5:
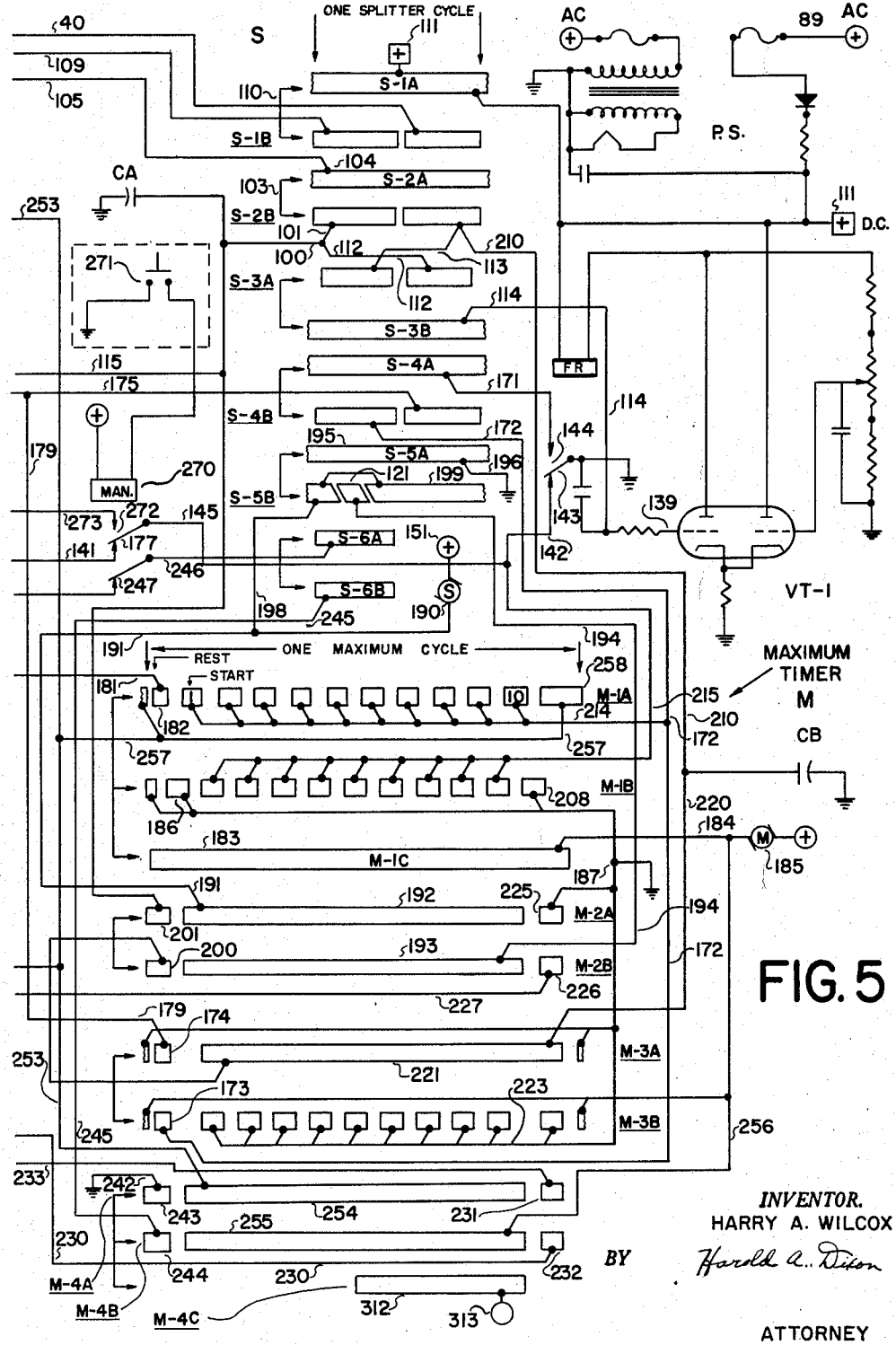

FIGS. 4 and 5 illustrate schematically a preferred embodiment of the traffic controller and control system in which the complete controller is derived by placing FIG. 5 to the right of FIG. 4.

Figure 6:
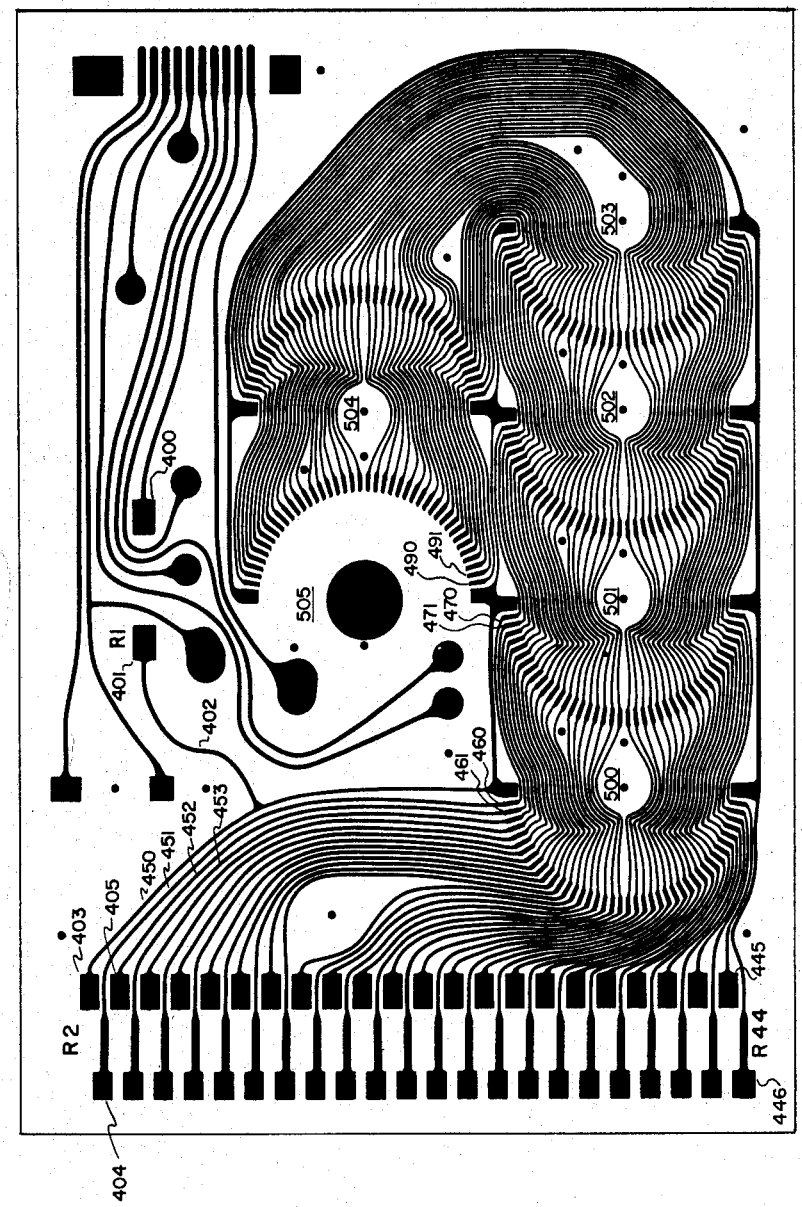

FIG. 6 illustrates the preferred printed circuit timing resistance circuit.

Figure 7:
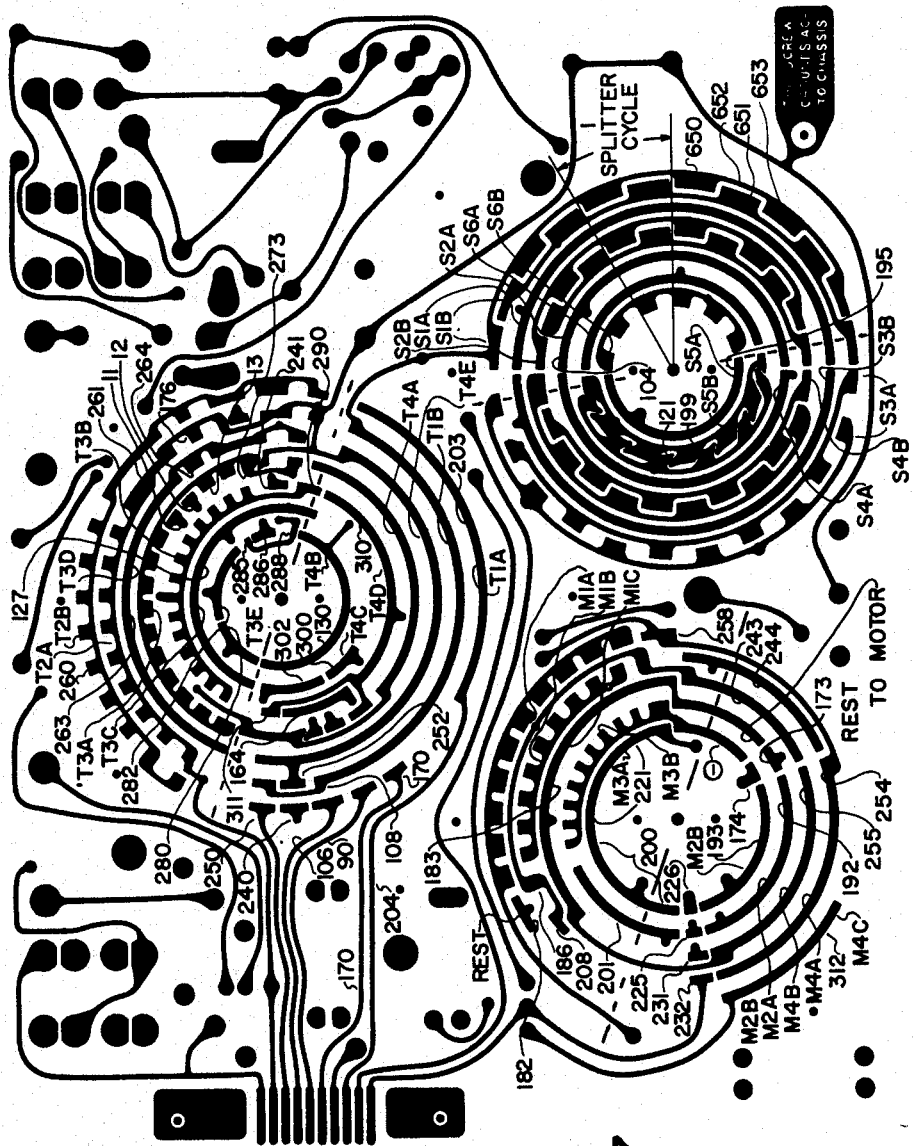

FIG. 7 illustrates the preferred circular arrangement of printed circuit timer contacts.

Figure 1:
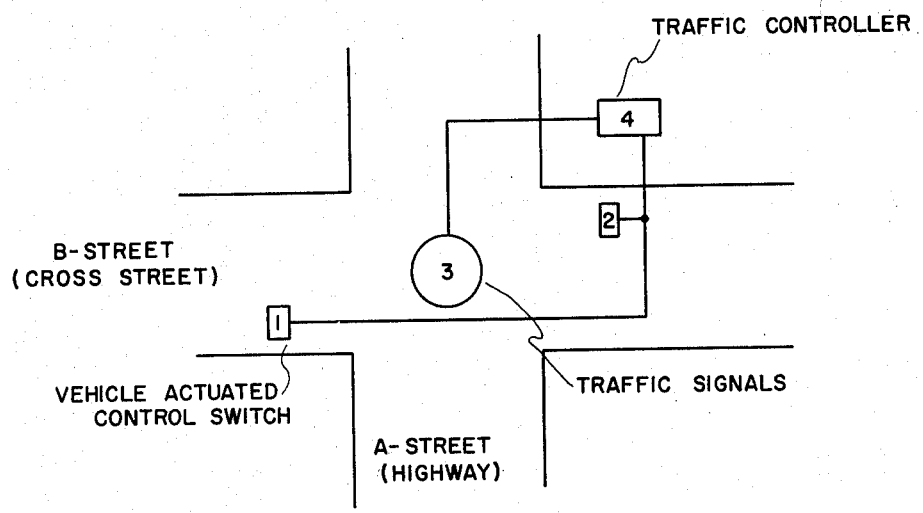

As shown in FIG. 1, a traffic control system embodying our invention may comprise 3 parts: vehicle actuated switches 1 and 2 placed in or at the side of or above the side street B; a traffic controller 4; and a signal device 3 to indicate right-of-way to traffic. A function of the actuated devices 1 and 2 is such that vehicles approaching on the cross street actuate electrical control circuits in the traffic controller 4, which in turn controls the right-of-way device 3. The right-of-way device 3, for informing the traffic in each street when to go and when to stop, may be the standard red, yellow and green lights now in general use for example, but may also be any other convenient or desirable type.

The vehicle actuated means 1 and 2 may be one of several types as hereinafter mentioned; one means may be of a mechanical nature such as a mechanical switch located in or at the side of the street; photoelectric means; electro-magnetic means; or a radar detector, for example.

The traffic controller 4 is of the traffic actuated type having a cyclic switching device referred to more particularly in FIGS. 4 and 5. Nevertheless, various aspects of the invention may relate to a traffic controller of the non-actuated type. However, to aid in understanding the application of FIGS. 2 and 3 to a traffic control system, a brief general summary of the controller operation is as follows:

Assuming there are no vehicles waiting or closely approaching the side street B, then the green right-of-way will be indicated to the highway or artery designated by A. However, when a first vehicle approaches on B-street it operates the actuating means 1 or 2 so that after showing a suitable yellow warning signal at 3, the controller 4 transfers right-of-way to B-street and succeeding B-street vehicles may cross the intersection. The green right-of-way will remain on B-street for a "B-vehicle period" for either an "extended minimum" or "maximum time" period so that it will be transferred back to A-street under either of the following conditions:

*Case I.*—After all B-street traffic has ceased or the succeeding vehicles are spaced a sufficient distance so that they do not warrant a right-of-way period (EXTENDED MINIMUM).

*Case II.*—If succeeding vehicles continue to approach on B-street at the end of a predetermined maximum period, the right-of-way is transferred back to A-street regardless of the presence of such vehicles on B-street (MAXIMUM). The various periods are controlled by suitable timing mechanisms.

Provision to re-transfer the right-of-way to A-street (terminate the B-vehicle period) as outlined under Case I, is accomplished through the use of a timing mechanism which provides sufficient minimum B-vehicle time for the first individual B-street vehicle to cross the intersection. This timing mechanism is reset towards its starting position each time a succeeding vehicle operates the B-street actuating means and hence is referred to as a variable minimum or extendible B-vehicle minimum time. Hence, as the last of said vehicles approaches on B-street, or such vehicles are sufficiently spaced in distance, this minimum timing mechanism, as extended, will eventually finish timing the B-vehicle period it is set for, and the right-of-way may be re-transferred to A-street from B-street.

To provide for Case II, in which continuous closely spaced B-street traffic must be interrupted, another timing mechanism, a maximum B-vehicle timer, is provided which is not reset by vehicles on B-street; when the maximum timer has timed a predetermined period for which it is set, the "B-vehicle period" is terminated and a right-of-way transfer is initiated to A-street from B-street regardless of the fact that vehicles may still be present on B-street. The maximum time period here is considerably greater than the minimum time period referred to in the previous paragraph.

When a right-of-way transfer is initiated after a maximum B-street time interval, as in Case II, vehicles which have not had sufficient time to cross the intersection remain, on B-street, even though they have actuated the B-street actuating means. To prevent these vehicles from being stranded, the controller, in response to the operation of the maximum timer, then "remembers" this condition so that right-of-way will eventually be retransferred to B-street after an A-street period without requiring any additional actuation of the B-street vehicle actuation means.

Whenever right-of-way is given to the highway, A-street, such right-of-way may remain showing on the highway for at least a certain "artery minimum period" before it may again be transferred to the cross street. This is accomplished by providing a timing mechanism which starts timing as soon as right-of-way is given to the highway and prevents transfer to the side street until the minimum artery period has been timed.

If several side street vehicles have passed the actuating means while being given the stop signal, some time will elapse after they have been given the right-of-way signal, before the last of these vehicle can get into motion. For this reason, an additional "initial timing" mechanism is provided which permits waiting vehicles to get into motion prior to the B-vehicle period.

In order to obtain all of the foregoing timing functions for artery minimum, side street initial, and the side street maximum and resettable minimum in the traffic controller, two condensers, and only a single relay control circuit and the same resistor charging circuit are employed in combination with associated circuitry.

In a preferred embodiment, for example FIGS. 4 and 5 these functions are performed by connecting the two condensers, in parallel, to the resistor as a charging circuit during the A-minimum period and connecting a traffic signal controlling relay to be operated after a predetermined time as represented by a predetermined charge on the condenser. During the B-street interval, the parallel condenser connection is broken and each of the condensers is then alternately connected to the timing resistor by means of a splitter motor switching circuit. Each of the condensers is alternately sampled and capable of operating the relay. Vehicle actuated means are provided which reset the charge on one of the condensers, thereby delaying its capability of operating the relay for an "extendible time period" as determined by the spacing of vehicles on B-street.

The other condenser when charged operates the relay to step a printed circuit maximum cyclic timer through one step. A sequential series of operations of the relay by this other condenser results in sequential stepping of the maximum timer to complete its cycle. At the end of the maximum cycle, means are provided for initiating a reversal of the right-of-way.

Also in FIGS. 4 and 5 a plurality of similar individually adjustable calibrated switches are provided for connection to any point on a single resistor bank so that two condensers may adjustably time a plurality of traffic phases, one of which has two alternate time periods, on the same time base. If a first condenser were used to time A-green for example and then it was desired to alternately time two periods for the B-vehicle by alternately connecting the first and second condensers to the timing resistance, the indicating switches could not be the same since during the A-green the first condenser would be timed for 100% of the time while in the B-vehicle period the condenser would be timed for only 50% of the time.

The calibrated dials indicate the R-C time and for a plurality of functions, in a traffic controller, it is desirable that they be similar. Hence by connecting the first and second condensers of equal value in parallel during the A-green period to produce twice the capacity and alternately during the B-vehicle period, the same adjustable time periods may be provided using the same resistor and calibrated switches.

While I have generally described above a traffic control system, controller and timer embodying my invention, and have shown that this invention may comprise three interconnected parts, I will now describe in detail several signal timing circuits for the provision of the two B-vehicle time intervals.

FIG. 2 as schematically illustrated in FIGS. 2A, 2B, 2C and 2D shows four simplified embodiments of maximum and extension minimum timing circuits in which two condensers are alternately charged and alternately sampled or interrogated thereby to provide traffic signal switching after either a maximum time or an extendible minimum time. Thus the speed and accuracy with which the traffic signals are controlled after the termination of either time period depends largely upon the rate of alternations.

The above functions of timing and sampling in each embodiment are performed by a printed circuit rotary switching device in cooperation with two condensers which in one position connects a charging circuit for one condenser and concurrently interrogates or samples that condenser to permit it to control the traffic signal switching. In a second position of the switch, the second condenser is connected in a charging circuit and concurrently is interrogated to permit it to control a second signal control circuit while the first condenser is neither being charged nor effective for signal switching. In FIG. 2A the condensers are of unequal value; in FIG. 2B, the condensers are substantially of the same value but one condenser includes an additional resistance in its timing circuit; in FIG. 2C the condensers are of substantially equal value, but one condenser is associated with a delay or accumulator device; in FIG. 2D, the condensers are substantially of the same value but the switch contact lengths are apportioned unequally.

Thus FIGS. 2A and 2B have a low or minimum R-C time constant circuit and a higher or maximum R-C time constant circuit connected for equal time periods while FIG. 2D has two condenser circuits of the same R-C time constant value connected for unequal time periods; FIG. 2C has two equal R-C time constant circuits connected for equal periods of time but which utilizes an accumulator or delay device with one of the R-C circuits.

FIG. 2A schematically illustrates a means for concurrently timing and sampling at least two different time functions alternately using two condensers, $C_A$ and $C_B$, a single common charging resistance $R_T$, and a single common relay FR which is alternately connected to be operated by some sampled predetermined charge on either of the two condensers in cooperation with a vacuum tube or similar control device. Each condenser is alternately connected to the resistor $R_T$ in a timing circuit by a rotating splitter motor SM and its associated rotary switch S-1. Condenser $C_B$ is indicated as greater than $C_A$; therefore, $C_A$ may be considered as a part of a minimum timing circuit and $C_B$ may be considered as part of a maximum timing circuit. In the position as shown, $C_A$ charges from ground 5 and line 6 through the fixed contact 7 of S-1, through the rotating switch contact 8 to line 9 and through timing resistor $R_T$ to the positive source 10. Thus the charge on $C_A$ increases with time at a rate dependent upon $R_T$ during the time when it is connected.

The relay FR and tube T are shown as connected between the rotary switch contact 8 and ground and thus alternately sample the charge on each of the condensers. The tube may be a gas tube or similar control device having a predetermined breakdown voltage. The relay may be normally deenergized; a relay alone or other control device may be used since such equivalents are obvious.

As the splitter motor rotates so that the rotating contact 8 engages stationary contact 11 on the right side of S–1, $C_A$ ceases to charge but retains its accumulated charge; $C_B$ now begins its charge from ground 5 to stator contact 11 through rotor 8 timing resistor $R_T$ to source 10.

If the splitter motor continues to rotate, $C_A$ and $C_B$ will be alternately charged to higher and higher values; the voltage charge on $C_B$ will be lower than on $C_A$ because of the larger capacitive value of $C_B$ and because both $C_A$ and $C_B$ use the same charging resistance $R_T$.

Consequently, $C_A$ would normally first reach some high predetermined voltage and energize relay FR which is alternately sampling the condenser charges; thus the ganged rotating contact 8′ of switch S–2 is in the left hand position in contact with 7′ when relay FR is energized by $C_A$ since S–2 and S–1 are ganged at 16 to the splitter motor and thus are in synchronism with each other.

The operation of the relay FR thereby provides power for energizing the traffic signals 15 from the positive source 10, to line 18, through closed relay contacts FR–3–4, to rotary contact 8′, to 7′ on the left hand side of S–2 over line 12 to the traffic signals. If $C_B$ had first reached a predetermined charge, line 13 would have been energized.

Two lines 12 and 13 are shown for controlling the traffic signals. However, only one operation of the traffic signals is desired, and that operation is designed to occur after either an extended minimum or maximum time interval. If one time interval has expired, one line (12 for example) is energized. Either time interval may expire first depending upon the extension of the minimum time. Therefore, it is desired that the first expiration of one of the time intervals will operate the traffic signals, but that the subsequent termination of the other time interval will be ineffective. Therefore, in the example above in which $C_A$ energized the relay and energized the traffic signals over line 12, the effect of $C_B$ subsequently reaching a predetermined charge, which could operate the relay and energize line 13, should be negated.

For example, circuitry may be provided so that the energization of FR by $C_A$ will stop the splitter motor so that there can be no further charging or sampling of $C_B$; further FR relay contacts may be provided for opening the splitter motor circuit when the relay has fired. Thus, if $C_A$ energized the relay, the splitter motor would stop in the left portion of its cycle and vice versa.

Another alternative, for example, would provide means for "locking in" the traffic signal by a relay for example when first energized over one of the lines. The subsequent energization of the other line would therefore be ineffective. Means could then be provided for dropping out the lock-in means at a later portion of the cycle, for example. Another alternative is that of FIGS. 4 and 5 in which the traffic signal switch is a cyclic means controllable in one position (15) by either of lines 175 or 227 corresponding to lines 12 or 13. Thus the first energization of line 12 or line 13 (or of line 175 or line 227 of FIGS. 4–5) will drive the cyclic means from position 15, thereby making the other line ineffective.

Now if, for example, this timing system of FIG. 2A were applied to a traffic control system for the purpose of retaining the right-of-way signal on the side street selectively for at least a preset or extendible minimum period, or for no greater than some maximum preset period of time in which the selected right-of-way period is determined by vehicle traffic on the side street, $C_B$ may be used to determine the preset maximum interval; $C_A$ may be used to determine a minimum interval and the traffic actuator in the side street will close a reset switch means 14 momentarily to short out $C_A$ to provide an extendible minimum. Therefore successive vehicle actuations by closely spaced vehicles on B-street will continually reset the charges on $C_A$ thereby extending the time interval before the relay will fire to switch the traffic signals to allow right-of-way on the main artery. However, if $C_A$ is being continually reset, $C_B$ will, subsequently at a maximum time, reach the required predetermined charge (since it is not reset) and will energize the relay FR to energize the traffic signal 15 on line 13 through the right side of S–2 contact 11′ and rotor 8′ to source 10 after the maximum time.

While it was assumed that FR is normally deenergized, it will be noted that, as shown, there is a possibility of energizing the FR relay as the brush on S–1 rotate into the gap. This may be prevented by several obvious circuit additions; for example, the brushes of S–1 may be split to overlap the gap and have a high impedance between each other; also a contact may be placed adjacent the gap to bias the tube to cut-off; or relay FR may be a slow acting relay.

Thus one relay FR, one resistor $R_T$, two capacitors $C_A$ and $C_B$ and rotary switch contacts S–1 and S–2 are all arranged to alternately connect and sample two charging circuits and to alternately permit traffic signal switching in response to the sampling of either charging circuit, but will allow signal switching in response to only one of the charging circuits.

FIG. 2B illustrates a further embodiment of the timing means which is similar to FIG. 2A except that $C_A$ and $C_B$ have equal capacities and $R_X$ has been added to the $C_B$ timing circuit. Additional splitter contacts have been added for sampling. It is obvious that $R_T$ could be placed between condenser $C_A$ and the left side of S–1 and that $R_X$ may be a resistor greater than $R_T$. The result is the same as in FIG. 2A since $R_X$ is of a sufficiently high value to make the R-C time constant of the $C_B$ charging circuit greater than that of $C_A$.

FIG. 2C represents a still further embodiment of the timing circuit using an accumulator device 20 which accomplishes substantially the same results as in FIGS. 2A and 2B but has particular advantages as will be noted hereinafter. It will be appreciated that in FIG. 2A if the maximum time is substantially different from the minimum time, and if the timing circuit is to be applied to a traffic signal controller, the minimum time may vary from 0–20 seconds for example and the maximum time may vary from 30 seconds to several minutes for example; the two capacitors in such a case in FIG. 2A may have values from 5–100 microfarads for the minimum and maximum values respectively, for example. The large capacitor $C_B$ for maximum timing in FIG. 2A therefore will be both bulky and expensive. Furthermore, each condenser is subject to leakage and this leakage is not linear with respect to the value of the capacitors. Furthermore, when printed wiring circuits or other surface type switches S–1 and S–2 are used, insulation at the switches is difficult and they are constantly plagued by surface moisture. This results in considerable leakage from the condensers across the switch contacts. When one condenser value is different from another the leakage will be different. The embodiment of FIG. 2B has the disadvantage that while $C_A$ and $C_B$ have the same value of capacity and hence may both have a low minimum capacity cost and leakage, an additional resistor is required; this eliminates the advantages which are acquired by using only a single timing resistor $R_T$ for a plurality of timing functions with the capacitors.

FIG. 2C overcomes the above disadvantages and provides additional advantages as will appear in FIGS. 4 and 5; by introducing element 20 as part of the maximum timing circuit while still retaining the advantage of a single timing resistor and equal low value capacitors $C_A$ and $C_B$.

This delay or accumulator element 20 may be any type of electronic or electro-mechanical delay element known in the art; for example, a time delay relay or time controlled hard or thyratron tube circuit and is preferably a printed circuit stepping relay which makes a complete cycle for a series of pulse actuations.

In FIG. 2C during the preset and extendible minimum time operation on the side street, $C_A$ will be reset by closely spaced vehicles to operate as in FIGS. 2A and 2B. The absence of closely spaced vehicles will result in $C_A$ reaching the predetermined charge when in the left position of S–1 to fire the relay FR and thereby directly energize the traffic signal switch means over line 12 through the left position of switch S–2.

Condenser $C_B$, being of equal value to $C_A$, has the same time constant circuit through $R_T$ as was provided for $C_A$. Hence, periodically $C_B$ will energize relay FR during the right side portion of the rotary switching means. Such operation of the relay will not directly control the traffic signal switching over line 13 as in FIGS. 2A and 2B. Instead a delay device 20 is utilized which will provide the adjustable maximum time interval; the delay element 20 in cooperation with relay contacts FR–3–4 (when $C_B$ has energized relay FR in the right portion of the rotary switch cycle) will control switching of the traffic signals over line 13 after a maximum time interval.

Either the first input to the delay device 20 may be delayed for a maximum time, or the delay device may require a plurality of successive inputs over a maximum time before an output is produced. In either case the delay device will control the traffic signal switching means over line 13 after a maximum predetermined time.

Should $C_A$ reach its predetermined charge during the timing of the maximum interval, its charge will operate the traffic signals immediately over line 12 before the termination of the maximum interval.

As has been stated above, the delay element may be for example of a first type in which a received pulse is delayed in the element 20 for a maximum time or of a second type as illustrated in FIGS. 4 and 5 in which a series of input pulses are periodically received over a maximum time interval and these pulses will control the delay element 20 in a periodic or step fashion to produce an output after a series of such steps corresponding to a maximum time interval. Also, means may be provided as discussed with reference to FIG. 2A to allow a traffic signal to change only in response to the completion of either the extension minimum or maximum time interval.

FIG. 2D is a fourth embodiment of a timing circuit illustrating that variation in the size of the splitter motor switching contacts S–1 will provide a plurality of different timing circuits in which the time period of the timing circuit varies with the size of its associated switch contact. As shown, stationary contact 7 is larger than stationary contact 11. Condenser $C_A$ is connected to 7 and $C_B$ is connected to 11. Hence, assuming that $C_A$ and $C_B$ have equal capacities, the charge on $C_A$ will reach a predetermined charge in fewer revolutions of the splitter motor than $C_B$. In the foregoing example, the charges on $C_A$ and $C_B$ at any time depend directly upon the relative length of 7 and 11. Thus $C_A$ will again time a minimum interval while $C_B$ will time a maximum interval.

It will be obvious that this timing circuit is not limited to two circuits nor is it limited to variation in size of the contacts. For example, by providing that the splitter motor derives its power through rotating switch contacts, the motor may be driven alternately at a high and low speed by providing that for a portion of the cycle the motor is driven from one frequency source, and through another portion of the cycle the motor is driven from a different frequency source. In such a case the stator contacts 7 and 11 of S–1 in FIG. 2D may be the same size if $C_A$ and $C_B$ are equal.

In addition it should be noted that both timing circuits may be connected in a charging circuit without the provision of alternate charging. In such a case, alternate sampling alone may be sufficient. However in FIGS. 2A, 2C, 2D the alternate sampling and charging is provided by a single switch S–1 so that no particular advantage is gained by merely sampling alone. If desired, further switch contacts may be used to provide a separate switch for alternate charging and a separate switch for alternate sampling as is shown in FIG. 2B will appear in FIGS. 4 and 5 and these may be arranged so that one condenser may be sampled while the other is being charged.

FIG. 3 illustrates another embodiment of a timing circuit in a traffic controller based upon the principles taught above with relation to the embodiments of FIG. 2. FIG. 3 illustrates substantially the same timing circuits of FIG. 2 in which the discharge rather than charge of a condenser performs the timing function. Only one FIG. 3 is shown rather than four in the interest of brevity. By adding or eliminating certain elements, four circuits may be derived from FIG. 3 analogous to the four embodiments of FIG. 2.

FIG. 3 is disclosed as having condensers $C_A$ and $C_B$ and as having an accumulator or delay element 20. By shorting the delay element and making $C_B$ greater than $C_A$ a circuit analogous to FIG. 2A will result. By making $C_A$ and $C_B$ of equal value a circuit analogous to FIG. 2C may be derived. By varying the size of the splitter switch contacts, a circuit analagous to FIG. 2D may be derived.

Assume in FIG. 3 that $C_A = C_B$, and include the delay unit as in FIG. 2C; now if the preparatory switches 30 and 31 which are ganged at 32 are closed for an instant and then reopened, $C_A$ and $C_B$ will normally be completely charged in a positive direction. Rotation of the splitter motor will then alternately discharge $C_A$ and $C_B$ through $R_T$. The positive voltage across the condensers and $R_T$ or some fraction thereof is applied to the cathode of tube T holding it normally nonconducting. When one of the condensers is sufficiently discharged through $R_T$, the tube T and relay FR conduct to energize the traffic signal switching means 15 through either line 12 or 13 depending upon whether the discharge of $C_A$ or $C_B$ fired the tube and relay; if $C_A$ fired the tube, power is connected to line 12 through the left side of S–2, for example.

As S–1 rotates into its gap portion, a period will exist in which no cut-off bias is applied to the tube cathode; therefore, a condenser is placed across the cathode to hold this bias. Of course, an external bias source could be connected during this short interval; for example an additional printed circuit contact could be placed adjacent to this printed circuit gap to provide such cathode bias; also a slow acting relay FR may be used as previously described.

A reset switch means 14 responsive to vehicle actuation is shown which when actuated connects an additional charge circuit for $C_A$ rather than a discharge circuit as was provided in FIGS. 2A–2D, for example.

Assuming that closely spaced vehicles have successively operated the reset means, $C_A$ will remain charged while $C_B$ will be sufficiently discharged to fire the tube and relay thereby energizing the traffic signals on line 13 through the delay element 20 and the right side of switch S–2 to the power source through the closed relay contact after a maximum time determined by the delay unit.

Another alternative would utilize additional resistance in the dicharge circuit for one of the capacitors.

The *third alternative* of FIG. 3 would be analogous to FIG. 2A in which $C_B$ is greater than $C_A$ with the delay unit omitted.

In summary; FIGS. 2A–2D and 3 all show timing circuits which are capable of operating traffic signal circuits after a minimum time which is reset to extend its time by successive closely spaced vehicles or after a maximum time if the vehicle reset has continually operated to increase the extension minimum beyond the maximum time.

It should be noted that the condensers $C_A$ and $C_B$ may be charged to a negative rather than a positive source. For example, in FIG. 3, if $C_A$ and $C_B$ are normally charged negative a connection would have to be made to the grid of the tube rather than the cathode to keep the tube normally cut-off.

The Traffic Control System

FIGS. 4 and 5 combined side by side as indicated, illustrate a preferred form of semi-actuated traffic control system having artery and side street right-of-way periods and utilizing the timing element of FIG. 2C for providing side street right-of-way for either an extension minimum or maximum time period. Other timing units may be utilized for example, the one shown in FIGS. 2A, 2B, 2D or FIG. 3. However, it has been found that where a plurality of time functions are performed by alternate switching through printed circuit contacts it is most feasible to employ two equal capacitors; one capacitor for extension minimum and one capacitor coupled with the stepping switch accumulator or counter for maximum timing thereby being able to use lower valued capacitors and a single charging resistor with the consequent saving in cost.

The general operation of the traffic control system of FIGS. 4 and 5 basically maintains right-of-way on the main artery (A-street) for at least an "artery minimum time," rests in this position and then reverses the right-of-way to the side-street (B-street) only after a vehicle detector in B-street has been actuated. The right-of-way remains on B-street for at least a preset "Initial Time Interval" and a "Vehicle Time Interval." The preset Initial Time Interval is provided to allow the standing B-street vehicles to get into motion and its setting will depend upon the width of the intersection and detector position.

The B-street "Vehicle Time Interval" should preferably be controlled within reasonable limits, by the amount of traffic on B-street considering that A-street is the main artery upon which it is desired to normally maintain right-of-way.

Accordingly, after the B-initial period when the vehicles are in motion, means are provided for timing the B-vehicle period, and as successive vehicles pass the traffic detector they actuate it to reset the B-vehicle timing. Thus extension minimum timing is dependent upon traffice actuation and vehicles must besufficiently closely spaced to prevent the completion of the B-vehicle timing.

Since A-street is the main artery, it is undesirable to maintain right-of-way on the side street during the B-vehicle interval (side street green) for too long a period regardless of the number of closely spaced vehicles approaching during the side street green period. A maximum timer circuit having a series of steps, all of which have a manually adjustable predetermined value, is provided to operate the signals after reaching the predetermined maximum time as determined by a completion of the series of steps. After termination of either the extension minimum time period or the maximum time period, the signals are subsequently switched back to their normal condition with right-of-way on A-street.

General Description of Operation of FIGS. 4 and 5

The general operation of FIGS. 4 and 5 will be briefly described to facilitate an understanding of the specific operation and circuitry which will be described subsequently in showing a cycle of operation.

Three cyclic timers T, M and S (Traffic, Max and Splitter) each have a motor (129, 185 and 190) for driving brushes (shown as leads with arrows) across circularly arranged printed circuit contacts (shown as rectangular boxes in line form in FIGS. 4 and 5) whose preferred arrangement is shown in FIG. 7. The contacts are referred to as banks or tracks. The traffic timer has group of track T–1 to T–4 with individual brushes which are all ganged to motor 129. The brushes in each group are electrically connected to each other.

Yellow, red and green signal lamps are shown at the bottom of FIG. 4 under the control of relays 135 and 162.

Each of the timers (T, M and S) has a "rest" position in which the timers rest in the absence of traffic actuation.

The T-timer is adapted to move its brush groups (T1–T4 from left to right in a series of resistor-capacitor timed steps for controlling the red, yellow and green traffic signals by energizing relays 135 and 162. Stepping from positions 11, 12 and 16 is provided by other means as will be subsequently described.

When a side-street vehicle actuates a vehicle detector, the T-timer is driven from its rest position (11) to start its timed step-by-step cycle. The condensers $C_A$ and $C_B$ of FIG. 5 will charge through $R_T$ of FIG. 4 to energize relay FR of FIG. 5 and step the T-motor 129 of FIG. 4 from one position to another after a time delay.

In the B-vehicle position (15) of the T-timer the green right-of-way period is determined by either an extendible minimum or maximum time circuit. These circuits are provided by the Splitter and Maximum timer circuits of FIG. 5 when they are driven from their "rest" position to start their cycle of operation. The splitter rotates and provides alternate charging and sampling of two condensers $C_A$ and $C_B$ as in FIG. 2 while the MAX timer is capable of moving in a timed step-by-step manner similar to the T-timer.

If condenser $C_A$ first reaches a predetermined charge, it will directly control the T-timer on line 175 to drive it from position 15 and subsequently return it to rest.

If $C_B$ first reaches a predetermined charge, it will energize line 172 and line 214 in FIG. 5 and drive the MAX timer one step. Subsequent charges of $C_B$ will step the MAX timer to complete its cycle. A contact 226 at the right end of the MAX timer thus energizes the T-timer on line 227 to drive it from position 15.

Thus the T-timer of FIG. 4 has motor driven brushes, driven in timed step-by-step fashion from one printed circuit contact to another, to control traffic signals (at the bottom of FIG. 4) and in which one step (side street Vehicle Interval) is controlled for one of two timing periods under control of the splitter and maximum circuitry of FIG. 5.

Cyclic Operation

A controller cycle of operation will be described starting from the normal rest position (11 of the T-timer) in which artery green signal lamp 136 and side street red 137 signal lamp are energized (relays 135 and 162 both deenergized) from a positive source 169, through the relay contacts and signal lamps to ground.

In this assumed condition, the M and S timers of FIG. 5 are at rest. The S-rest position is with its brushes in line with contact 121 on track S–5B; the M-rest position is with its brushes in their far left position in line with contact 182 on M–1A as will appear subsequently.

A-Rest

Assume a vehicle appears on the side street. A side street vehicle detector (not shown) will then ground terminal 122 (lower left of FIG. 4) thereby energizing the BD (B street detector) relay 123. Relay 123 locks itself in over contacts 124, line 131 to T–4A (295) and through the brushes shorted at 132 to ground at 130 (T–4B). Pedestrian or test control is provided by switch 116.

The T-motor 129 is thereby energized to drive the controller from "rest." The circuit is from ground, BD contacts 125, line 119, junction 117, contact 11 of T–3A, through the brushes and jumper 126 to 127 (T–3C), lead 128 to T-motor 129 which is connected to a source of power at 134.

As motor 129 rotates, its power is disconnected as its brush moves off the eleventh contact of T-3A and thus the T-motor brushes rest half way between positions 11 and 12 (directly over contact 140 on T-3B).

Thus the T-motor 129 is again energized to move another half step to position 12 since contact 140 of T-3B is grounded through leads 141, MANUAL contacts 177, lead 145, 142, and back contacts 143 (ground) of the FR relay.

A-Coordination

Position 12 is a "coordination" position which may be omitted or by-passed if desired. In normal use, the co-ordination position permits coordination between a plurality of traffic controllers so that they operate in step simultaneously or progressively as desired under control of a master controller or of each other.

The T-motor 129 is driven a half step from the coordination position (12) by the provision of a coordination signal (ground) at 150 through the twelfth position of T-3A and the brushes to 127 (T-3C), lead 128 and motor 129. Terminal 150 may be a permanent ground if no coordination is desired.

The T-motor is then driven the second half step to position 13 since contact 160 on T-3B is connected to ground as previously described with respect to contact 140.

A-Yellow

With the controller in position 13 (A-yellow) the GR relay 162 (bottom of FIG. 4) is energized and the artery yellow signal 138 is indicated and timed while the side street red signal 137 remains energized. The GR relay 162 is grounded over lead 163, contact 164 on T-4D to ground 130 on T-4B through the brushes which are shorted at 132. The A-yellow indicator 138 has one side energized by connection through contacts 166, lead 167 contacts 168 and one terminal 169 of a source of power. Each of the lamps has its other side connected to ground.

Referring to FIG. 5 condensers $C_A$ and $C_B$ (which are still in parallel) time the A-yellow period by charging from ground to a positive source 111 (top of FIG. 5) through lead 100, 101, the left side of S-2B (since the splitter is at rest) shorting lead 103, S-2A, junction 104, lead 105, R-1, timing resistor RT, lead 170 to contact 13 of T-1A, shorting lead 107 to T-1B, lead 108, 109, the left side of S-1B, shorting lead 110, S-1A to source 111. $C_A$ and $C_B$ are in parallel through the "rest" position contacts 200 and 201 of M-2A and M-2B, contact 221 of M-3A and lead 220. Subsequently they are independently controlled by the Splitter.

In positions 14, 15 and 17 of the T-timer to be discussed subsequently similar condenser charging paths occur through the timing resistor and splitter switches; although the condensers may be independent in position 14 and 15 or in parallel position 1–10, 13 and 17.

After a time delay determined by the adjustable setting of lead 170 on timing resistor $R_T$, the charge on $C_A$ and $C_B$ which is increasing with time and, being continually applied to grid 139 of the tube VT-1 in this position 13, will energize the left side of VT-1 and relay FR. This circuit includes the grid 139 of VT-1, lead 114 and splitter sampling switch S-3B and the left side of S-3A which are connected to the condensers over leads 113, lead 210 to condenser $C_B$ and also via lead 220, 221 (M-3A), contact 200 of M-2B through the brushes to contact 201 of M-2A and then to $C_A$. (The splitter motor is in its rest position.) VT-1 is a monostable trigger circuit with the right side normally conducting and the left side non-conducting.

Energization of relay FR closes contacts 144 to drive the T-motor half way to position 14 by connecting ground through contacts 144, lead 171, S-4A, S-4B to 172 to contact 173 of M-3B through the brushes to contact 174 of M-3A, line 179, line 175 to T-3A (13) which is shorted through the brushes to T-3C to the T-motor 129. (The Max timer is in its rest position at the left.)

In this halfway position $C_A$ and $C_B$ are discharged at 176 on track T-2A; ground at 205 is connected through contact 176 (T-2A) through the brushes to T-2B (260), lead 115 to $C_A$ and $C_B$. The trigger circuit thus returns to its normal state with the right side conducting and FR deenergized.

Relay FR is thus deenergized by the condenser discharge so that the T-motor is driven the second half step to position 14 by connecting the ground through FR relay contacts 143, lead 142, 145, normally closed contacts 177, lead 141 to contact 178 of T-3B, through the brushes to 127, lead 128 and the T-motor 129.

B-Initial

In position 14, the controller provides for a side street "initial" green time (B-INITIAL) to permit standing vehicles to get into motion. The green signal 211 appears on the side street and the red signal 212 appears on the artery since both the RR and GR relays (135 and 162) are energized by the ground of T-4C and T-4D (302 and 164) to 130 (T-4B).

The MAX timer which had been "resting" is now driven from its "rest" position, at the left, to its "start" position 1 where it is ready to begin its timing by stepping through a series of adjustably timed steps.

The circuit for initiating the movement of the MAX motor 185 and for moving it a half step from its rest position is from ground at 130 on T-4B through the brushes to "start max" contact 180 on T-4A, lead 181, rest contact 182 on M-1A, through the brushes to 183 (M-1C), lead 184 to M-motor 185.

MAX motor is driven the second half step to "Start" position 1 since contact 186 on M-1B is grounded at junction 187.

Initiation of the MAX timer to its start position has opened the parallel connection of $C_A$ and $C_B$ at 200 and 201 on M-2A and M-2B so that $C_A$ is connected only to one side of the splitter switch S-2B and $C_B$ only to the other side.

In position 1 of the MAX timer the same brushes on M-2A and M-2B which previously connected $C_A$ and $C_B$ in parallel now short track 192 and 193 to start the splitter motor 190 rotating from source 151 to the splitter motor 190 through lead 191 to 192 (M-2A) to 193 (M-2B), 194 to rest contact 121, through the brushes to 195 (S-5A) and ground 196. As the splitter leaves its "rest" contact 121, it remains energized in all other positions of its cycle by the grounding of lead 198 through 199 (S-5B), through the brushes to 195 and ground 196.

Thus with the Splitter motor rotating $C_A$ and $C_B$ are alternately connected to a source of power through individual taps 90 and 91 of timing resistor $R_T$ respectively during the left and right portions of the Splitter cycle. Consequently after $C_A$ reaches a predetermined charge it will, when sampled on the right half of S-3A, energize the relay FR whose contacts 144 will thus step the T-motor half way to position 15. At this position the condenser is discharged and relay FR drops out to drive the T-motor the second half step to position 15 as previously described.

Thus it will be noted that any given part of $R_T$ timing resistance will time the same time interval in position 13 where $C_A$ and $C_B$ are in parallel as in position 14 where the condensers are separated. The reason is that in position 14 the condensers have one value of capacity which is being charged for 50% of the elapsed time while in position 13, twice this value of capacity is being charged for 100% of the elapsed time. Thus the voltage across either $C_A$ and $C_B$ in parallel in position 13 or $C_A$ alone in position 14 will be the same after any amount of elapsed time which is substantially gretaer than the time of one splitter cycle. Therefore similar calibrated dials may be used for adjustments of all the phases of the traffic cycle.

B-Vehicle Period

In position 15 (the B-vehicle period), a green signal 211 still appears on the side street and a red signal 212 still appears on the artery. It is desired to concurrently time an extension minimum period and a maximum time period and alternately sample these time periods to determine the side street green time interval or the instant at which right-of-way re-transfer is to be initiated.

The maximum timer is out of its rest position and the splitter motor is rotating.

In the left half of the splitter cycle, $C_A$ is charged from ground through $C_A$ lead 100, junction 101, the left side of S–2B to S–2A, junction 104 to lead 105, through R–1 and some adjustable part of $R_T$, lead 106, contact 15 of T–1A to T–1B, lead 108, 109, the left side of S–1B to S–1A and source 111. Simultaneously, $C_B$ is being sampled or interrogated at the grid of VT–1 by the connection from $C_B$ to lead 210, 113, the left side of S–3A, S–3B and lead 114 to the left grid of 139 of VT–1. On the other half of the splitter cycle, $C_B$ is being charged via line 40 and tap 91 and $C_A$ is sampled.

The above process of charging and sampling continues at a rate depending upon the rate of rotation of the splitter motor with respect to the printed circuit contacts. In the preferred embodiment, the switch contacts as shown in FIG. 7 are multiplied so that a lower speed splitter motor may be used.

As the condensers $C_A$ and $C_B$ are alternately sampled, on S–3A and S–3B, each is alternately capable of energizing VT–1 and relay FR. If $C_A$, when sampled in the right hand part of the splitter cycle, triggers VT–1 over line 114 to thereby energize FR, the T-motor is advanced toward position 16 and terminates the B-vehicle period; ground is connected to the T-motor from contacts 144 of FR, lead 171, S–4A, S–4B (right), lead 175, contact 273 of T–3A to 127 (T–3C) lead 128 to motor 129. This circuit is similar to lead 12 of FIGS. 2 and 3 for direct control of the traffic signals after a minimum time period.

Grounded contact 274 is provided on T–3A to cause the T-motor to continue its advance until its brushes are in position 16.

However, should a vehicle or a series of side street vehicle pass over the vehicle detector during this B-vehicle period, they will ground or reset condenser $C_A$ by energizing BD relay 123 to connect ground through contacts 125, lead 119, junction 117, lead 118 through a speed variable reset resistor 92 to contact 15 of T–2A, through the brushes to T–2B, lead 115 to $C_A$.

When an R–C time interval has elapsed since the last reset of condenser $C_A$, $C_A$ will, when sampled, energize FR to move the controller to position 16 after an extended minimum time period. In this case the side street green signal has been energized for a time period greater than the minimum but less than the maximum.

Condenser $C_B$, when sampled, will energize relay FR if it is sufficiently charged. This sampling occurs in the left half of the splitter cycle, when S–3A and S–3B apply the charge on $C_B$ to grid 139 of VT–1. If the charge on $C_B$ is sufficient, FR is energized to advance the MAX motor one step. Ten successive charges of $C_B$ will move the MAX motor through steps 1–10 and complete a MAXIMUM time. This occurs only when there are sufficient vehicles to continually reset $C_A$.

The circuit for advancing the MAX motor is from ground through FR contacts 144, lead 171, to S–4A and through the brushes to the left side of S–4B, 172, lead 214 of M–1A, through the brushes to 183 (M–1C), lead 184 and motor 185. In this half step position, condenser $C_B$ will be discharged over lead 220, 221 (M–3A) through the brushes to a contact on M–3B and lead 223 which is grounded at 187.

Relay FR is thus deenergized (since the left side of VT–1 ceases to conduct) thereby connecting ground through 143, 142, lead 215 to contacts on M–1B, through the brushes to 183, (M–1C), 184 and motor 185. Thus the MAX motor 185 has moved one full step from position 6 to position 7, for example in two half steps in dependence upon the energization and deenergization of relay FR by the charge and discharge of the condenser $C_B$.

Thus charging, sampling, energization of FR and discharge of condenser $C_B$ can move the MAX motor through 10 steps.

At the termination of the maximum timer (10 steps) the T-motor will be moved to position 16 since ground is connected from 187 to contact 225 (M–2A) through the brushes to 226 (M–2B), 227, 228, to "terminate B–V" contact 229 (T–3D) through the brushes to 127 (T–3C), 128 and motor 129. This circuit is similar to lead 13 in FIGS. 2 and 3 and terminates the B-vehicle period after a MAXIMUM time.

This last circuit however is ineffective if $C_A$ has previously terminated the B-vehicle period by moving the T-motor to position 16 since the T-brushes will not be on contact 229.

Completion of the MAX time places a "call" into the controller by energizing the BD relay 123; ground is connected to the BD relay 123 over lead 230, contact 232 on M–4B, through the brushes to contact 231, lead 233, "call" contact 234 on T–4A and through the brushes to ground at 130 on T–4B. The BD relay will be locked in at 295 on T–4A and will thus recall the controller in the next cycle.

The position of the "call" contact 234 is such that a call can be placed only if the MAX timer is in its farthest right hand position and the T-timer is in position 15. Thus if $C_A$ had stepped the T-timer from position 15, the passage of the MAX brushes through this right hand position (as will occur in the Memory Position 16) will not place a "call."

The splitter motor 190 is deenergized as soon as the brushes on M–2A and M–2B have run off of 192 and 193, and the splitter brushes arrive on contact 121 of S–5B.

Memory Position

With the controller in position 16, no timing is provided since contact 240 (16 of T–1A) is not connected to timing resistance $R_T$. The controller will "rest" in this position until both the MAX and Splitter timers return to their "rest" position. When this occurs contact 241 on T–3B is grounded to drive the T-motor to position 17. The circuit is from T-motor 129, lead 128, 127, through the brushes to contact 241, lead 248, manual contacts 247, lead 246, S–6A to S–6B, lead 245, contact 244 (M–4B) to 243 (M–4A) (MAX Rest Position) to ground lead 242. Thus this circuit requires that both the MAX and Splitter timers be in their rest position before the T-timer can leave position 16. The manner in which these timers have returned to rest is discussed below.

Under normal or light side street traffic, condenser $C_A$ will cause FR to operate before the MAX timer has completed all ten steps. Therefore, the MAX timer, which may have completed several steps, must be returned to its "rest" position. The circuit is from ground 205 on T–2A, lead 259, contact 252 on T–1B, through the brushes to contact 240 (position 16), lead 253, to contact 254 of M–4A, through the brushes to 255 of M–4B and lead 256 to drive M-motor 185 through any of the first ten steps which were not completed during the B-vehicle period. Contact 208 on M–1B is grounded at 187 and contact 258 of M–1A is grounded through lead 257 and 253 as described above so that the MAX motor 185 is driven through position 11 to its rest position at the left.

The splitter motor has come to rest with its brushes in line with 121 on S–5B; $C_A$ and $C_B$ are again in parallel at 201 and 200 of M–2A and M–2B and the T-timer is in position 17.

B-Yellow

In position 17, contact 250 of T–1A is connected by lead 251 to the timing resistance so that condenser $C_A$ and $C_B$ (which are again in parallel with the MAX timer at rest) may charge and time the B-yellow period. Relay FR will then be energized; condenser $C_A$ and $C_B$ will be discharged; and FR deenergized so that the T-motor moves to position 1 all as previously described.

A-Minimum

In positions 1–10, the same sequence of timing steps occur as in B-yellow and A-yellow with the condensers $C_A$ and $C_B$ charging through contact 203 of T–1A, lead 204, and the timing resistor. Thus after ten timed steps, the controller has returned to its "rest" position 11 to wait for another actuation of the B-street detector. However, if the MAX timer had completed ten steps, the controller will repeat its cycle because of the "call" placed at contact 234 previously described.

Having thus described the basic features of the invention and a preferred embodiment, it will be obvious to those skilled in the art that numerous modifications may be made within the scope of this invention. For example, the same condenser may be charged and sampled at the same time as in FIGS. 2 and 3. However, this method has the disadvantage of sampling a voltage which is rising while being sampled so that the point in the splitter cycle at which VT–1 is triggered and FR is energized will vary.

Fewer printed circuit contacts might be required in this suggested and other conceivable modifications. A single tube or other control device may be substituted for the dual tube shown or the tube may be omitted. A multivibrator having relay contacts may be substituted for the splitter motor and its contacts, but with obvious maintenance problems in comparison with the motor driven printed circuit switch. Also, the A-minimum timing may be performed in one step rather than a series of steps.

Additional Features of the Preferred Embodiment

Many additional features are included in the preferred embodiment several of which are briefly referred to below.

While the T-timer and M-timer could step from one position to another directly after a timed interval, the preferred embodiment discloses a system in which the T-timer and M-timer move only a half step after the timed interval. In these half step positions, $C_A$ or $C_B$ are discharged to ground; one circuit is from $C_A$, lead 115 through 260 (T–2B) and through the brushes to a contact on T–2A at a half-step position which is grounded at 205; the other circuit is from $C_B$ via lead 220, 221 (M–3A) through the brushes to half-step contacts on M–3B, lead 223 and ground at 187. Relay FR is thus deenergized and the T or M motor is energized the second half-step over T–3B or M–1B from the grounded back contacts 143 of FR.

Contact 261 is provided on T–2A to keep the condenser discharged and relay FR deenergized during the "rest" and "coordination" period.

Manual control of the T-timer is provided by switch 271 which energizes manual relay 270 to connect ground through FR relay contacts 143, lead 142, lead 145, energized manual contacts 272, 273, 228 to contacts 263, 264, 229 and 265 on T–3D, through the brushes to 127 (T–3C) thereby driving the T-motor 129. Energization and deenergization of manual switch 271 thus controls the T-motor manually.

With the manual control relay 270 energized, the T-timer may move through positions 1–12 since contact 263 of T–3D will be grounded and thereby drive T-motor 129. When the manual relay is subsequently deenergized, contact 160 on T–3B is grounded and will drive motor 129 to position 13 where the ARTERY yellow signal is shown; when the manual relay 270 is again energized, contact 264 on T–3D will drive motor 129 toward position 14. When the manual relay has again been deenergized contact 178 on T–3B will drive the T-motor to position 14. Similarly contacts 229 and 265 on T–3D will cooperate with contacts on T–3B to drive the T-motor when the manual relay is energized and deenergized.

During manual operation, the timing power to the condensers would normally be opened at the source 89.

Additional control of the T-timer and M-timer is provided to speed up the controller or to take away control. For example, contact 280 on T–3E may be grounded at 281, when desired, to reduce the "A-minimum" time by eliminating the requirement of timing the first five steps. Similarly contact 312 on M–4C may be grounded at 313, when desired to reduce the MAX. Thus the T-motor 129 or MAX motor 185 is driven directly from contact 280 or 312 and the associated brushes rather than in a series of timed steps.

Contacts 280 and 282 on T–3E may be grounded at 281 and 283 as desired to "preempt" the controller from phase A-green to the A-yellow position 13. The yellow signal will be timed by $C_A$ and $C_B$ charging through lead 170 and RT so that the resulting energization of relay FR and motion of the motor will cause the brushes to traverse contact 285 of T–3E. Thus contact 178 of T–3B which is grounded, is connected through the brushes to contact 285 of T–3E. This ground is therefore an accurate indication of the termination of A-yellow.

Output terminal 289 which is connected to 285 through contact 288 may thus control an external relay circuit which may control the signals or other signals in some desired pattern. Such controls are appropriate in the vicinity of railroad tracks and fire apparatus.

Contact 286 on T–3E may be grounded at 287 to "preempt" the controller into the B-yellow position by application of a ground signal at 287 as desired. Such grounding of 287 will drive the controller to its "memory" position 16 at which the MAX and Splitter motors are zeroed (as previously described) before the controller is driven into the B-yellow position 17 for timing. After the yellow period has been timed, contact 288 of T–3E is grounded from 290 of T–3B to energize the output terminal 289; thus in both cases safe preemption control is provided precisely at the end of a yellow interval by the accurate positioning of contacts 285 and 288.

"Lock-in" of the BD relay 123 when actuated by a vehicle is provided by contact 295 on T–4A so that a vehicle which crosses the detector during steps 1–11 or 16 and 17 will be "remembered" during portions of the traffic cycle when B-street does not have the right-of-way. Grounding of call contact 234 on T–4A after completion of a MAX period also locks in the BD relay. No lock-in is provided during the side street green so that resetting of condenser $C_A$ may occur to extend the minimum time period.

"Out going coordination" is provided at contact 300 on T–4C so that ground may be connected from 130 on T–4B through the brushes to 300 and out to terminal 301 which may be connected to a subsequent traffic controller as an "incoming coordination" signal. Thus other controllers along a roadway may be controlled as desired by contact 300. Such "incoming coordination" was referred to previously at 150 on T–3A.

The yellow, red and green traffic signals are energized in dependence upon the GR and RR relay 135 and 162 which in turn depend upon whether the brushes are connecting the ground of 130 (T–4B) to either or both 302 and 164 on T–4C and T–4D respectively.

In addition to the MAX timer "zeroing" circuit (for returning it to its "rest" position) which includes the contacts of position 16 in T–1A and T–1B as previously described an additional circuit including contacts 310 and 311 of T–4D and 217 of T–4A is provided to drive the MAX motor to its rest position. These two circuits connect ground to lead 218, leads 253 and 254 on M–4A and 214 on M–1A from ground 130 of T–4B.

Thus if a mechanic were to misalign the brushes, this additional circuit provides a safety feature for driving the MAX and Splitter motors to rest in all except the B-green periods.

Also it should be noted that during the B-vehicle period the charging circuits for $C_A$ and $C_B$ besides being alternately charged over the left and right sides of S–2B respectively, also have an alternate connection over the left and right side of S–1B respectively. Thus while a single bank of resistors is common to both condensers, the amount of resistance in each circuit can be independently adjustable. Thus the R-C time constant of $C_B$ is adjustable at 91 over lead 40 which connects to the right side of S–1B while $C_A$ is adjustable at lead 106 which is connected through the brushes to lead 109 and the left side of S–1B. Obviously more than two intervals may be timed simultaneously by having more than two sections per splitter cycle.

Also in the preferred embodiment, the maximum timer starts its cycle at the beginning of the B-initial position 14 of the T-timer and continues throughout the B-vehicle period 15. Ordinarily, during the B-initial period condenser $C_A$ will become charged to step the T-timer to position 15 before the maximum timer has completed two or three steps in its cycle. Then in position 15 either $C_A$ (EXT. MIN) or $C_B$ (MAX) may terminate the B-vehicle period as previously described. However, should the B-initial control be defective (thereby ordinarily making the controller inoperative), the maximum timer can step the controller through both of these intervals.

Also, throughout the drawing, circuits have been shown connected from a plus source to ground. This plus source may, in general, be A.C. or D.C. although condenser timing power at 111 should be D.C. A.C. power would be connected to operate the relays, motors and lamps for example. Two such power supplies are shown in FIG. 5.

*The Timing Resistor Circuit*

The timing resistor $R_T$ circuitry of FIG. 4 is shown in line form and includes a plurality of adjustable contact arms 204, 170, 90, 106, 251 and 91 respectively each individually adjustable to time the A-minimum, A-yellow, B-initial, B-vehicle, B-yellow and B-max intervals.

FIG. 6 illustrates a printed circuit board having printed contacts for connection of individual resistors in a series bank and having a plurality of parallel connected wires and switches; each switch being capable of connection to any tap of the resistor bank as a preferred embodiment.

Contacts 400 and 401 are provided for connection of resistor R–1 of FIG. 5 which provides a minimum timing resistance of 100K ohms. Contact 400 would be connected to lead 105 in FIG. 4.

R–1 is connected through lead 402 to contact 403 which is the first of a series of contacts. Timing resistor $R_T$ comprises a series of forty-three 25,000 ohm resistors which are connected between the bank contacts at the left of FIG. 6. For example, a first resistor is connected between contacts 403 and 404; a second resistor is connected between contacts 404 and 405; this sequence of connections continues until the forty-third resistor is connected between contacts 445 and 446.

To each of the contacts one of a group of parallel printed leads is connected, as for example 450, 451, 452, 453, etc.; each of which serve as a tap point on the resistor bank $R_T$.

Six switches 500–505 are shown having fixed printed contacts, for example 460, 461, 470, 471, 490, 491, etc.; all the contacts being through printed circuit leads to the tap points on the resistor bank $R_T$. The rotor of each of these switches is not shown but would be mounted to be manually rotated to contact any of the fixed contacts of its switch. Thus leads 204, 170, 90, 106, 251 and 91 in FIG. 4 represent the rotors of switches 505, 504, 503, 502, 500 and 501 respectively.

The preferred embodiment of FIG. 6 has thus provided a single bank of resistors which may be used for timing six time intervals; each interval is independently adjustable over the complete resistor bank.

A plurality of individually adjustable resistors may be used, one for each timing interval, as is well known in the art. However, such an arrangement provides inaccuracy in each of the steps when varied with respect to a calibrated dial because of the non-linearity of such potentiometers over a range of values.

The large number (43) of resistors which have been used provide that the timing of individual periods may be varied in substantially two percent steps as desired.

*Printed Circuit Timers*

FIG. 7 illustrates the preferred circular configuration of contacts for the T, M and S timers. The T-pattern is substantially completely legended while only a few legends have been used on the MAX and Splitter patterns. The numerals used are the same as those for FIG. 4.

The pattern of contacts on the left represents the T-timer while the MAX and Splitter contacts are shown at the lower right and top respectively. Each of the patterns have been divided by dotted lines.

One half of the T-pattern includes T–2, and T–3 while the other half includes T–4 and T–1. One cycle of the T-timer is thus completed in one half rotation by using two identical sets of brushes displaced 180° on the rotor. Each set of brushes includes five brushes connected together and two brushes connected together. The tracks are so placed that each group of five interconnected brushes traverses the five "T–3" tracks during one half rotation, and the five "T–4" tracks during the other half rotation. Also each group of two brushes alternately connects tracks T–2 and T–1.

The brushes on the MAX and Splitter timers are similarly arranged in two sets.

The Splitter configuration of contacts is of particular interest since one cycle of the splitter motor in FIGS. 2, 3 or 5 occur in only a few degrees of rotation. This occurs because alternate splitter contacts such as 7 and 11 in FIG. 2 may be shown as 650 and 651 in FIG. 7.

Contacts similar to 650 and 651 occur alternately and are connected together such as by leads 652 and 653.

Thus a single rotation of the splitter rotor switch will charge and sample the condensers many times (twelve, for example) providing increased accuracy while permitting a slower speed motor.

The same operation could be performed with a faster motor, or a slower motor may be used with smaller contacts. The limitation on the smallness of the contacts is the inertia of the motor and the speed of the relay FR. If the contacts are too small, one condenser will be sampled but the wrong circuit (T or M) might be stepped because by the time relay FR operates, the wrong motor circuit will be connected.

While the splitter motor provides equal charge and sampling time for the condensers, this time for each is slightly less than 50 percent of the total elapsed time because of gap between successive contacts on any one splitter track, for example S–1B. Thus a slight inaccuracy may be present in the desired R-C charging times between different phases of the controller. However, a slight difference in the calibration of the associated dials will correct this slight deficiency.

Track T–4E has not been mentioned because it serves merely as a spare which may be segmented to perform any desired functions. As the fifth track of T-4, it completes the symmetry of T-4 with T-3 since it is desired that the whole pattern be symmetrical as is obvious in FIGS. 4 and 5.

Also, while most of the contacts are rectangular in FIGS. 4 and 5 some contacts are shown as parallelograms or trapezoids having one side slanted; for example, contacts 273, 274, 121 etc. The slanting of one side of one contact which is adjacent another contact having an opposite slant, permits a narrow brush contact to overlap both contacts when passing from one contact to the other. The same result may be obtained with only rectangular contacts and a wider brush. However in the preferred embodiment, it is desirable to have a small gap between the splitter contacts S-1B and S-3B for example. If a wider brush were used to overlap contact 121 on S-5B, for example, the same sized brush would also overlap the gap in S-1B and S-3B resulting in simultaneously charging and sampling of both condensers which would be undesirable.

Besides the advantage obtained from the symmetrical character of the printed circuit contacts, other advantages exist. For example, a repairman can clearly observe the overall operation of the controller by watching the T, M and S rotary brushes step through their cycle on a single insulating board. As a further aid to the repairman, the various phases of the traffic signal cycle, and positions of the maximum and splitter timers may be legended on the board adjacent the respective contacts for those positions.

Many modifications have been suggested but it will be obvious that numerous other equivalent modifications will suggest themselves to those skilled in the art. Accordingly, the invention is defined in the following claims.

I claim:

1. In a traffic controller having first and second circuit means for controlling the termination of right-of-way for side street traffic in response to the first completion of either a vehicle extendible minimum or maximum time period respectively, both of which periods are contemporaneously timed within the right-of-way period, the combination of first and second condenser means, each connected to one terminal of a power source; a printed circuit board including a first plurality of contacts circularly arranged and a second plurality of contacts circularly arranged; motor means having a first rotor contact for scanning said first plurality of contacts and a second rotor contact for scanning the second plurality of contacts so that both pluralities of contacts are scanned in synchronism, means for connecting the first and second condensers individually to alternate contacts of said first plurality of contacts, means for connecting the first rotor contact to a terminal of said source of power so that the charge on each condenser alternately will vary with time from an initial value to a final value in a series of steps, at least one step occurring during each rotation of the rotor contact means for individually connecting alternate contacts of said second plurality for controlling said first and second circuit means respectively, means connected to said first condenser for resetting the charge on said first condenser to said initial value in response to vehicle actuation during said side street right-of-way period, means connected for sampling the charge on each of the condensers and for operating in response to a predetermined charge on either as the condenser charge approaches said final value, means responsive to said sampling means for energizing either said first or second circuit means through the second rotor contact so that the right-of-way is terminated by either the first or second circuit means in dependence upon which condenser operates the responsive means when sampled.

2. The combination as in claim 1 in which the second condenser has a larger capacitive value than said first condenser substantially in proportion to the desired ratio between the maximum and minimum times.

3. The combination as in claim 1 in which the second condenser means includes a resistor and a capacitor having substantially the same value as the first capacitor.

4. The combination as in claim 1 in which the alternate contacts of the first plurality of contacts are of different relative lengths in proportion to the desired relationship between the maximum and minimum time periods.

5. The combination as in claim 1 in which the alternate contacts of both the first and second plurality are of different lengths.

6. The combination as in claim 1 in which both condensers are normally charged and are alternately discharged through the first rotor which is connected to a timing resistor.

7. The combination as in claim 1 in which the means for individually connecting alternate contacts of said second plurality to said first and second circuit means includes a maximum delay means connecting one of said contacts to said second circuit means.

8. The combination as in claim 7 in which said delay means includes a further plurality of printed circuit contacts circularly arranged, motor means, rotor means driven by said last named motor for scanning said further plurality of contacts, and means for sequentially driving said last named motor and rotor in steps from one contact to another in response to sequential energization of said sampling member by said second condenser.

9. The combination as in claim 1 further including an additional plurality of printed circuit contacts, additional rotor means, second motor means for driving said additional rotor sequentially across said additional plurality, said first and second circuit means each including one of said contacts of said additional plurality which when energized are adapted for stepping said second motor from one position to another, two of said additional contacts being adapted for controlling right-of-way traffic signals.

10. A combination as in claim 1 in which the means connected for alternate sampling includes a relay and electron conducting device connected between the first rotor and said one terminal to be alternately energized by either condenser having a predetermined charge.

11. A combination as in claim 1 in which means for alternate sampling include a third plurality of contacts and an additional rotor ganged to said motor for scanning these contacts in which alternate contacts of the third plurality are connected to alternate contacts of the first plurality and the additional rotor is connected to energize a common relay circuit.

12. The combination as in claim 11 in which the third plurality of contacts are cross connected to the first plurality of contacts so that while one condenser is being charged, the other is being sampled.

13. The combination as in claim 1 in which the means connecting the first rotor to a terminal of said source of power includes a resistive impedance means so that a common timing base is provided for both condensers.

14. A combination as in claim 13 in which said impedance includes a plurality of series connected resistors, and further including means for individually adjusting the impedance in each condenser circuit including printed circuit leads connected to each junction of resistors and at least two switches having a manually rotatable contact for connecting to any one of said printed circuit leads and means for alternately connecting said source to said contacts.

15. A traffic control system comprising the combination of alternate traffic signal control circuits, means for providing a plurality of electrical signals in time sequence and individually progressively varied in value, in the same direction, with time over a relatively long time period, means including a common electrical value sensing element for individually measuring, in periodc sequence, at relatively short time periods, each of said electrical signals and in which said common element responds to any said electrical signal having a predetermined value, and control means operated by said common element for controlling said traffic signal over one or the other of said alternate circuits in dependence upon which of the measured electrical signals first reaches said predetermined value and operates said common element.

16. The combination as in claim 15 in which said last named means includes a motor driven cyclic stepping switch means having a plurality of sequential steps and means connecting said motor to be energized by the response of said common element to one of said electrical signals so that a plurality of such responses will step the motor driven switch means through all of its steps, and means for so controlling said traffic signal over one of its alternate circuits when said motor driven switch means reaches its last step.

17. In a traffic controller for operating traffic signals for providing right-of-way on a roadway for either one of at least two time periods in dependence upon roadway traffic, the combination comprising first and second condensers and means connected therewith during said right-of-way period to vary in charge with time; means connected for alternately interrogating each of said condensers during said right-of-way period including a common means for responding to a predetermined charge of either of said condensers; vehicle actuated switch means for resetting the charge on the first of said condensers, when actuated, to a value of charge away from said predetermined charge; and means connected for terminating the right-of-way period in response to the operation of said common means by a predetermined charge on one of said condensers.

18. A combination as in claim 17 and including means by which said first and second condensers are alternately connected during the right-of-way period to vary in electrical charge thereby alternately timing first and second time periods.

19. A combination as in claim 17 and including means by which the condensers are successively alternately connected and alternately interrogated in synchronism.

20. The combination as in claim 17 and including means by which the condensers are alternately connected in synchronism with the alternate interrogations and further including means for interrogating one condenser while connecting the other condenser to vary in charge with time.

21. The combination as in claim 17 in which the means for terminating the right-of-way period includes a maximum timer having a sequence of steps, means for energizing said maximum timer when said common member responds to a predetermined charge on said second condenser so that successive such charges on said second condenser drive the maximum timer through its series of steps, and means operated in the last step of said maximum timer for terminating the said right-of-way.

22. A printed circuit traffic controller including first, second and third control means mounted on an insulated panel, each said control means including a plurality of printed circuit contacts and motor driven brush contacts for scanning said contacts; certain of the contacts of the first and third of said control means being connected to drive its associated motor in steps when energized, signal control means connected to be energized through other certain contacts of said first control means in certain steps of its associated motor and brush, first and second condenser means individually connected to alternate contacts of said second control means, means for operating the motor to drive the brushes of the second control means for alternately interrogating the first and second condenser at the contacts of the second control means to alternately provide interrogated outputs, means responsive to an interrogated output of said first condenser having a predetermined electrical value for energizing the said certain contacts of the first control means to drive its associated motor or for energizing the said certain contacts of said third control means in response to an interrogated output of the second condenser having a predetermined electrical value for driving said third motor, and means connected to one of said contacts of said third control means for energizing said first motor so that traffic control signals are switched by rotation of the first motor under control of either the first condenser or the second condenser and the third control means.

23. Traffic control apparatus for alternately timing two individually adjustable time periods contemporaneously during one phase of a traffic signal cycle using one timing impedance comprising an insulator panel; first and second pluralities of contacts printed on said panel, and similarly arranged; first brush means for alternately contacting the contacts of the first plurality of contacts; second brush means, ganged to said first brush means, for alternately contacting the contacts of the second plurality of contacts; two terminals of a source of power; first and second condensers, each having one end connected to one terminal; means connecting the other ends of the condensers to alternate contacts of the first plurality, resistive means having a plurality of connecting points, a plurality of substantially parallel printed circuit leads each connected to a connecting point, two manually adjustable switch means each having a contact rotor for connection to any of said parallel leads, means connecting the contact rotors to alternate contacts of said second pluralities of contacts, and means for connecting the other terminal of the power source to said first brush through alternate paths including said resistor as adjusted and said second pluralities of contacts to said first brush for alternately varying the charge on the condensers as adjusted by said switches.

24. In a traffic controller for timing a plurality of right-of-way periods and having a cyclic multi-step stepping means for stepping from one step to another after the termination of a timing period for controlling traffic signals, the improvement in the timing means including first and second condensers, means for alternately connecting each of said condensers to a timing impedance circuit during one step of said cyclic means to provide two time functions during said one step, and means for connecting said condensers in parallel with each other and in series with said timing impedance for providing a single time function in another step of said cycle so that two condensers may provide more than two time functions through a single impedance circuit.

References Cited in the file of this patent
UNITED STATES PATENTS

| | | |
|---|---|---|
| 1,931,851 | Bradford | Oct. 24, 1933 |
| 2,135,472 | Renshaw | Nov. 1, 1938 |
| 2,288,601 | Barker | July 7, 1942 |
| 2,932,003 | Barker | Apr. 5, 1960 |
| 2,995,143 | Strathearn | Aug. 8, 1961 |
| 3,032,752 | Welch | May 1, 1962 |
| 3,035,128 | Maynard | May 15, 1962 |

OTHER REFERENCES

"PR System of Coordinated Traffic Control," Eastern Industries Bulletin E-224, copyright 1956, pages 3 and 4 relied on.